UNITED STATES PATENT OFFICE.

JOHN CARNRICK, OF NEW YORK, N. Y.

LIQUID DIGESTIVE COMPOUND.

SPECIFICATION forming part of Letters Patent No. 412,835, dated October 15, 1889.

Application filed June 22, 1889. Serial No. 315,263. (No specimens.)

*To all whom it may concern:*

Be it known that I, JOHN CARNRICK, a citizen of the United States, residing at New York city, in the county of New York and State of New York, have invented certain new and useful Improvements in Liquid Digestive Compounds; and I do hereby declare the following to be a full, clear, and exact description of the invention, such as will enable others skilled in the art to which it appertains to make and use the same.

This invention relates to the manufacture of a medical compound adapted particularly for digesting and increasing the absorption of fatty matters.

The object of the invention is to provide a mixture or compound of digestive agents which by their united action will thoroughly digest fatty matters and prepare them for assimilation in a manner not attainable by any of the digestive agents alone; also, to provide a preparation which can be readily taken by persons afflicted with constipation and wasting diseases and are in an emaciated condition, with the satisfactory result of producing a vigorous healthy tone in the alimentary canal and giving relief from constipation, and also resulting in rapid increase in fat, flesh, and weight of the person using it.

The more special and specific object is to make a liquid preparation of pancreas or sweet-breads and bile and mix them with a suitable vehicle in such manner as to form a most efficient compound to effect the digestion and assimilation of fats, and especially adapted for remedial action in the human system.

It is known that the pancreatic juice and extracts of pancreas aid materially in the digestion of fats; but it has been ascertained that the pancreatic juice alone will digest but a moderate per cent. of the ordinary amount of fat supplied to the living subject, while the same amount of fat is practically all digested (all but about one per cent.) in subjects in which the secretions of both pancreas and bile are permitted to act in their normal way.

A high authority recently states as a result of his investigations that " separately, neither the bile nor the pancreatic juice is capable of effecting the complete digestion and absorption of fatty substances, but their mixture is, the pancreatic secretion causing their division and the bile promoting their absorption." It has also been ascertained by experimental research that bile possesses a well-marked anti-fermentative property.

The established properties and beneficial action of the bile indicate that it is an important remedial agent when properly combined and administered. The compound of pancreatine, or extract of pancreas, and bile, as prepared in accordance with my invention, not only causes the digestion and absorption of fats, but materially aids the digestion of albuminous substances, and also serves to convert starchy matter into an assimilable condition.

My digestive compound being a mixture of pancreatine and bile, I have for convenience named it "Pancrobilin." In order to prepare it, fresh sweet-breads (pancreas) in suitable quantity are first carefully dressed by removing with a knife all the adhering fat. They are then chopped fine in a chopping-machine. The finely-comminuted mass is then digested in alcohol of ninety-five per cent. strength, in the proportion of about forty-five pounds of pancreas to three gallons of alcohol, for a period of about ten hours, for the purpose of loosening and partially dissolving the fatty matter entangled in its tissues preparatory to its removal. The alcohol also prevents pancreatic digestion of the fatty matter contained in the parenchyma during manipulation of the raw material. The period of maceration having been completed, the mass of pancreas is well pressed to squeeze out the moisture and fat, after which it is carefully dried in the drying-chamber. When well dried, it is reduced to a fine powder, preferably in a roller-mill. It is quite important to remove the fatty matter entangled in the parenchyma of the pancreas, as above described, in order to present the digestible principle in the most active and favorable condition. This dried powder prepared from pancreas, as above described, constitutes my pancreatine, and is in proper condition to mix with prepared bile and a suitable excipient to form pills. Two and a half ounces of dry powdered pancreatine represents the substance of twenty-five fresh sweet-breads.

In order to prepare the bile for use in my compound, it is first removed from the gallsack and then mixed with a suitable proportion of alcohol and allowed to stand about twenty-four hours for the mucus and other impurities to settle, after which the liquid is decanted. This liquid is then filtered through animal or wood charcoal to further purify it, after which it is evaporated to dryness. This purified bile may be used directly in the dry powdered condition in the manufacture of pills.

When making liquid pancrobilin, which forms the subject of this application, the powdered pancreatine, prepared as above described, is macerated about twenty-four hours in water, the dry powdered pancreatine being in about the proportion of two and one-half ounces to each gallon of the finished liquid pancrobilin. After maceration, the swollen pancreatine is thoroughly agitated in water in order to impart its active digestive principle to the water. The exhausted fibrous matter or connective tissue of the pancreas and the sand are then removed by filtration or by decanting the liquid from the sediment. The water thus impregnated to the proper strength with the digestive ferment, the active principle of the pancreas is ready for use in making my liquid pancrobilin, which is preferably composed of ingredients in about the following proportions in each gallon: pancreatic liquid, eighty parts; alcohol, twenty parts; powdered bile, seventy-two grains; glycyrrhizine, seventy-two grains; sugar, twelve ounces. The above mixture is flavored to suit the taste with oils of orange, cassia, coriander, anise, and caraway. Any two or more of the oils may be used, as desired.

Strong wine or brandy or other alcoholic spirits may be substituted for alcohol in the above compound.

This liquid compound is administered in doses of from one to two table-spoonfuls, preferably about two hours after meals.

I do not herein claim the process of preparing the liquid digestive compound, that being the subject of my application for patent bearing Serial No. 315,264, filed June 22, 1889.

Having described my invention, I claim and desire to secure by Letters Patent as follows:

1. A liquid compound adapted to cause the digestion and absorption of fats, containing a fluid extract of pancreas and bile mixed in suitable proportions.

2. A liquid compound adapted to cause the digestion and absorption of fats, containing suitable proportions of a fluid extract of pancreas, bile, and alcoholic preservative.

3. A liquid compound adapted to cause the digestion and absorption of fatty matter, containing a fluid extract of pancreas, purified bile, an alcoholic preservative, sugar, and suitable flavoring substances.

In testimony whereof I affix my signature in presence of two witnesses.

JOHN CARNRICK.

Witnesses:
WM. F. MCPHERSON,
ALLEN CHAMBERLIN.